US011900752B2

(12) United States Patent
Miyazawa et al.

(10) Patent No.: US 11,900,752 B2
(45) Date of Patent: Feb. 13, 2024

(54) MEDIUM PROCESSING DEVICE AND MEDIUM TRANSACTION DEVICE

(71) Applicant: Oki Electric Industry Co., Ltd., Tokyo (JP)

(72) Inventors: Daisuke Miyazawa, Tokyo (JP); Madoka Wakabayashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 739 days.

(21) Appl. No.: 17/044,849

(22) PCT Filed: Apr. 11, 2019

(86) PCT No.: PCT/JP2019/015785
§ 371 (c)(1),
(2) Date: Oct. 1, 2020

(87) PCT Pub. No.: WO2019/225195
PCT Pub. Date: Nov. 28, 2019

(65) Prior Publication Data

US 2021/0110628 A1 Apr. 15, 2021

(30) Foreign Application Priority Data

May 22, 2018 (JP) ................................ 2018-098005

(51) Int. Cl.
*G07D 11/26* (2019.01)
*G07D 11/40* (2019.01)
(Continued)

(52) U.S. Cl.
CPC ............. *G07D 11/26* (2019.01); *G07D 11/16* (2019.01); *G07D 11/40* (2019.01); *G07D 11/60* (2019.01);
(Continued)

(58) Field of Classification Search
CPC ........ G07D 11/16; G07D 11/26; G07D 11/40; G07D 11/60; G07D 2211/00
See application file for complete search history.

(56) References Cited

U.S. PATENT DOCUMENTS

2019/0295352 A1 9/2019 Takefushi et al.

FOREIGN PATENT DOCUMENTS

CN 103295316 B * 10/2015
JP H04140243 A 5/1992
(Continued)

OTHER PUBLICATIONS

Notice of Reasons for Refusal in the counterpart Japanese application No. 2018-098005 dated Aug. 9, 2022.

*Primary Examiner* — Howard J Sanders
(74) *Attorney, Agent, or Firm* — Rabin & Berdo, P.C.

(57) ABSTRACT

A medium processing device includes a casing that has an opening through which an interior of the casing communicates with an exterior thereof, a first unit that is storable in the casing, with a first end thereof at a side of the opening, a second unit that is storable in the casing, with a second end thereof at the side of the opening, a conveyance section, including a roller, provided in the first unit, the conveyance section conveying a medium by rotating the roller, and a roller manual drive section that is provided in the first unit, and the is configured to allow the roller to be manually rotated. The roller manual drive section is provided in a vicinity of the first end of the first unit when the first unit is stored in the casing.

8 Claims, 7 Drawing Sheets

(51) Int. Cl.
*G07D 11/16* (2019.01)
*G07D 11/60* (2019.01)
*G07D 11/12* (2019.01)
*G07D 11/14* (2019.01)

(52) U.S. Cl.
CPC .............. *G07D 11/12* (2019.01); *G07D 11/14* (2019.01); *G07D 2211/00* (2013.01)

(56) References Cited

FOREIGN PATENT DOCUMENTS

| | | | | | |
|---|---|---|---|---|---|
| JP | 2010055337 | A | | 3/2010 | |
| JP | 2010276077 | A | | 12/2010 | |
| JP | 2013-174946 | A | | 9/2013 | |
| JP | 2017228251 | A | | 12/2017 | |
| WO | WO-2011077876 | A1 | * | 6/2011 | ........... B65H 29/006 |

* cited by examiner

MEDIUM PROCESSING DEVICE AND MEDIUM TRANSACTION DEVICE

TECHNICAL FIELD

The present disclosure relates to a medium processing device and a medium transaction device, and is applied to, for example, an automatic teller machine (ATM) that performs a desired transaction by inserting a sheet-shaped medium such as a banknote.

BACKGROUND ART

ATMs widely employed in financial institutions and the like allow a user to deposit cash in the form of banknotes or coins, or allow a user to withdraw cash, according to the content of transactions with the user (financial institution customers, etc.). One type of ATM is known as a re-cycling type (or recirculating type), in which banknotes deposited by a user in one transaction are reused and withdrawn by another user in a subsequent transaction.

Some re-cycling type ATMs are installed with a banknote deposit/withdrawal device that performs, for example, processing relating a deposit/withdrawal of banknotes (see, for example, Japanese Patent Application Laid-Open (JP-A) No. 2013-174946). Such a banknote deposit/withdrawal device includes, for example, a customer interface section that gives banknotes to a user and receives banknotes from a user, a conveyance section that conveys banknotes, a classification section that classifies the denomination, authenticity, and other characteristics of the inserted banknotes, and a temporary holding section that temporarily holds the inserted banknotes. The banknote deposit/withdrawal device further includes banknote storage boxes that store banknotes that may be re-used by denomination and a reject box that stores banknotes that should not be re-used.

Some ATMs include an upper unit and a lower unit that can be pulled out from a casing of ATM respectively and are physically independent from each other. The upper unit includes, for example, the customer interface section, the classification section, the temporary holding section and the reject box. The lower unit includes, for example, the banknote storage boxes. The upper unit and the lower unit of ATM hand off banknotes between their respective conveyance paths in a state where they are stored within the casing of ATM.

SUMMARY OF THE INVENTION

Technical Problem

In such an ATM, the banknote may be broken when the upper unit or the lower unit is pulled out from the casing in a case where the banknote remains to straddle the upper unit and the lower unit. Thereby, the upper unit or the lower unit cannot be pulled out from the casing and a recovery work that removes a jammed banknote may not be performed.

The present disclosure proposes a medium processing device and a medium transaction device that can improve usability.

Solution to Problem

A medium processing device of the present disclosure includes a casing that has an opening through which an interior of the casing communicates with an exterior thereof, and a door that opens and closes the opening, a first unit that is storable in the casing, with a first end thereof at a side of the opening, the first unit being configured to be pullable out from the casing, a second unit that is storable in the casing, with a second end thereof at the side of the opening, the second unit being configured to be pullable out from the casing, a conveyance section, including a roller, provided in the first unit, the conveyance section conveying a medium by rotating the roller, and a roller manual drive section that is provided in the first unit, and the is configured to allow the roller to be manually rotated. The roller manual drive section is provided in a vicinity of the first end of the first unit when the first unit is stored in the casing.

A medium transaction device of the present disclosure includes a user interface section that receives an input for a transaction instruction relating to a sheet-shaped medium, a casing that has an opening through which an interior of the casing communicates with an exterior thereof, and a door that opens and closes the opening, a first unit that is storable in the casing, with a first end thereof at a side of the opening, the first unit being configured to be pullable out from the casing, a second unit that is storable in the casing, with a second end thereof at the side of the opening, the second unit being configured to be pullable out from the casing, a conveyance section, including a roller, provided in the first unit, the conveyance section conveying a medium by rotating the roller, and a roller manual drive section that is provided in the first unit, and that is configured to allow the roller to be manually rotated. The roller manual drive section is provided in a vicinity of the first end of the first unit when the first unit is stored in the casing.

According to the present disclosure, the operator can rotate the roller of the conveyance section by operating the roller manual drive section easily from the side of the opening, and can move the jammed medium in the conveyance section so as not to straddle the jammed medium between a plurality of units. Thereby, the operator can remove the jammed medium by pulling out a unit on a side where the jammed medium remains from the casing.

Advantageous Effects of Invention

According to the present disclosure, the operator can rotate the roller of the conveyance section by operating the roller manual drive section easily from the side of the opening, and can move the jammed medium in the conveyance section so as not to straddle the jammed medium between a plurality of units. Thereby, the operator can remove the jammed medium by pulling out a unit on a side where the jammed medium remains from the casing. The usability of the medium processing device and the medium transaction device can thus be improved.

DESCRIPTION OF EMBODIMENTS

Hereinafter, an embodiment carrying out the invention (hereinafter, referred to as an exemplary embodiment) will be described with reference to the drawings.

1. Exemplary Embodiments

1-1. Overall Configuration of an Automatic Teller Machine

Figure 1:
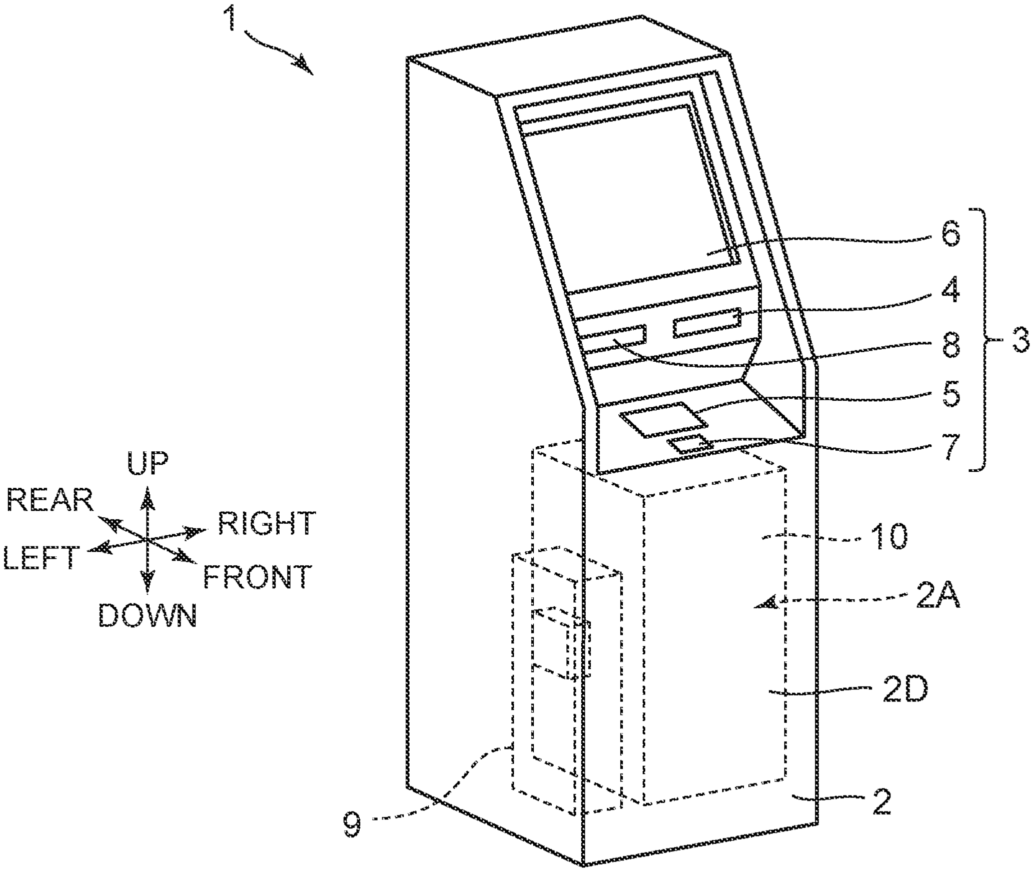
FIG. 1 is a perspective view illustrating an external configuration of an ATM.

As illustrated in the external view of FIG. 1, an ATM 1 is configured mainly by a box shaped casing 2, and is, for example, installed in a financial institution, various commercial facilities or the like to perform cash transactions such as deposit transactions and withdrawal transactions with a user (that is, a customer of the financial institution or the commercial facilities).

The casing 2 is provided with an interface section 3 at a location enabling easy banknote insertion, touch panel operation, and so on by the user who is facing the front side of the casing 2. The interface section 3 is provided with a card insertion/removal port 4, a deposit/withdrawal port 5, an operation display section 6, a ten-key 7, and a receipt issue port 8. Cash, cards, and the like are passed between the interface section 3 and the user directly, and the interface section 3 notifies transaction information and receives operation instructions.

The card insertion/removal port 4 is a section for insertion and return of the various cards such as cash cards. A card processing unit that reads account numbers and the like magnetically recorded on the various cards is provided behind the card insertion/removal portion 4. The deposit/withdrawal port 5 is a section that is input with banknotes being deposited by a user, and that dispenses banknotes being paid out to a user. Also, the deposit/withdrawal port 5 is opened or closed by driving a shutter.

The operation display section 6 is integrated with a Liquid Crystal Display (LCD) that displays operation screens during a transaction, and a touch sensor for inputting transaction type selections, PINs, transaction amounts, and the like. The ten-key 7 is a physical keypad that receives input of, for example, the numbers 0 to 9, and is employed to receive a PIN code and a transaction amount or other operations requiring a user to input information. The receipt issue port 8 is a section that issues receipts printed with transaction details and the like at the end of transaction processing. The receipt issue port 8 that prints transaction details and the like on the receipt is provided behind the receipt issue port 8.

The casing 2 has a casing opening 2A that an internal space surrounded by the casing 2 and an outside are in communication with each other, and is provided with a front door 2D that can open and close the casing opening 2A in the front side, which is the side of the casing opening 2A. The casing 2 protects internal parts of the ATM 1 by closing the front door 2D when the transactions are performed with a customer. On the other hand, when the maintenance work is performed by an operator such as a maintenance staff and a staff of a financial institution, the casing 2 allows the operator to perform work for the internal parts by opening the front door 2D as necessary.

In the ATM 1, a maintenance face that the maintenance work is performed is a left side, and the maintenance work of an upper unit 10U or a lower unit 10L (FIG. 2) is performed from the left side after the front door 2D is opened and the upper unit 10U or the lower unit 10L is pulled out from the casing 2. Specifically, the left side of the upper unit 10U and the lower unit 10L (that is, a medium processing device) may be referred to as the maintenance face, and the maintenance face is a side of the upper unit 10U and the lower unit 10L (the medium processing device) at which an operator performs the maintenance work. On the other hand, a right side of the upper unit 10U and the lower unit 10L (the medium processing device) may be referred to as a non-maintenance face. In the ATM 1, only one of the upper unit 10U and the lower unit 10L can be pulled out from the casing 2 at a time, and the upper unit 10U and the lower unit 10L cannot be both pulled out from the casing 2 at the same time.

In the following explanation, the side of the ATM 1 that a user faces is defined as the front side, and the opposite side thereto is defined as the rear side. The left side and the right side left are respectively defined by the left and right from the perspective of a user facing the front side, and the upper side and lower side are also defined from the perspective of a user facing the front side.

A main controller 9 that performs overall control of the ATM 1, a banknote deposit/withdrawal device 10 that performs various processing related to banknotes, and the like are provided inside the casing 2. The main controller 9 is configured mainly by a Central Processing Unit (CPU), and reads and executes predetermined programs from Read Only Memory (ROM) or flash memory, or the like, in order to control the respective sections so as to perform various processing in deposit transactions, withdrawal transactions, and the like. The main controller 9 includes a storage section configured by Random Access Memory (RAM), a hard disk drive, flash memory, or the like inside, and store various information in the storage section.

1-2. Configuration of Banknote Deposit/Withdrawal Device

Figure 2:
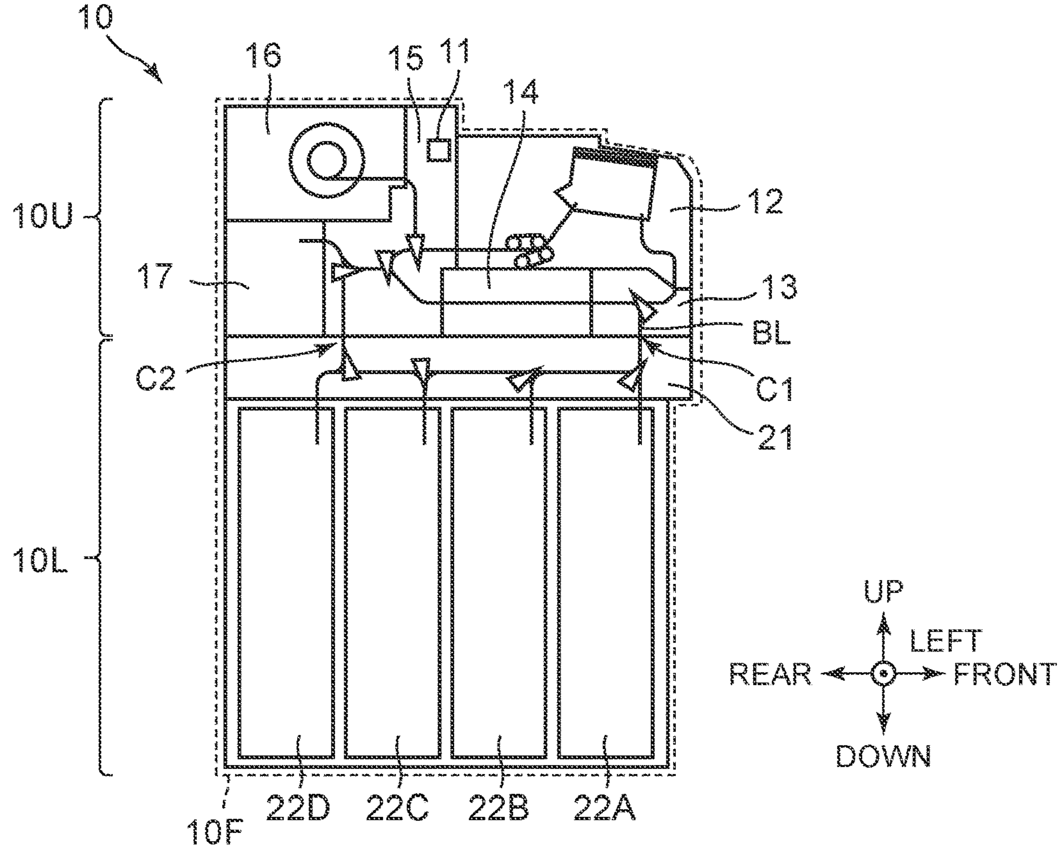
FIG. 2 is a left side view illustrating an internal configuration of a banknote deposit/withdrawal device.

As illustrated in FIG. 2, the banknote deposit/withdrawal device 10 is a medium processing device made up of a plurality of parts performing various processes relating to banknotes. The banknote is formed in a thin rectangular sheet-shape, for example, using a material such as paper or resin.

The banknote deposit/withdrawal device 10 includes a banknote deposit/withdrawal device frame 10F that makes up an outer portion of the banknote deposit/withdrawal device, the upper unit 10U occupying an upper portion above substantially the center in an up-down direction of the banknote deposit/withdrawal device frame 10F, and the lower unit 10L occupying a lower portion in the banknote deposit/withdrawal device frame 10F.

Figure 3A:
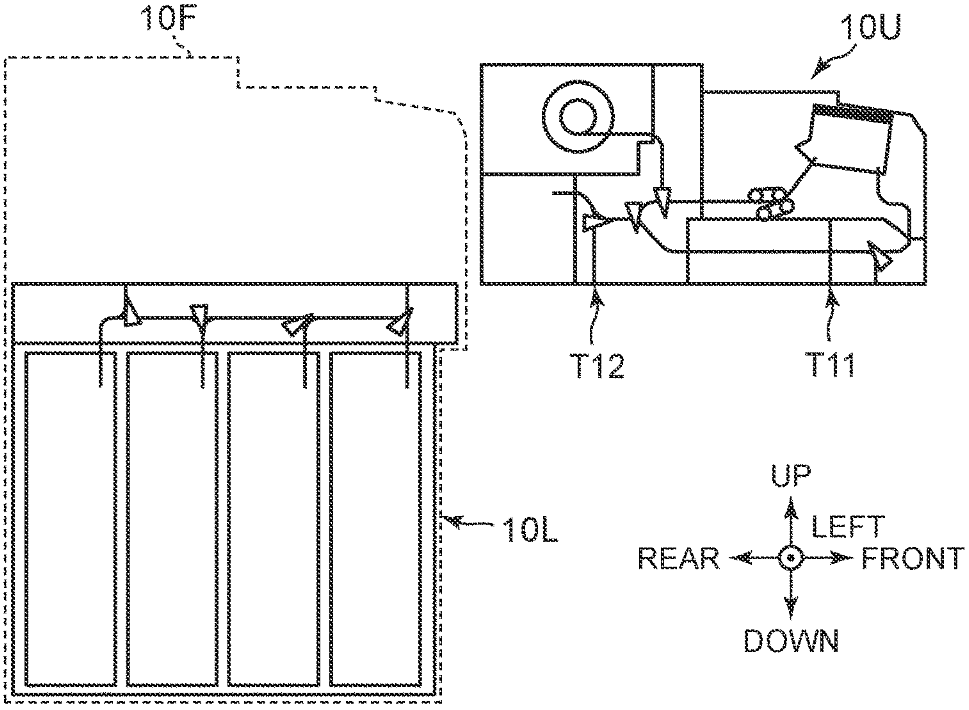
FIG. 3A is a left side view illustrating a state of pulling out an upper unit in the banknote deposit/withdrawal device.
Figure 3B:
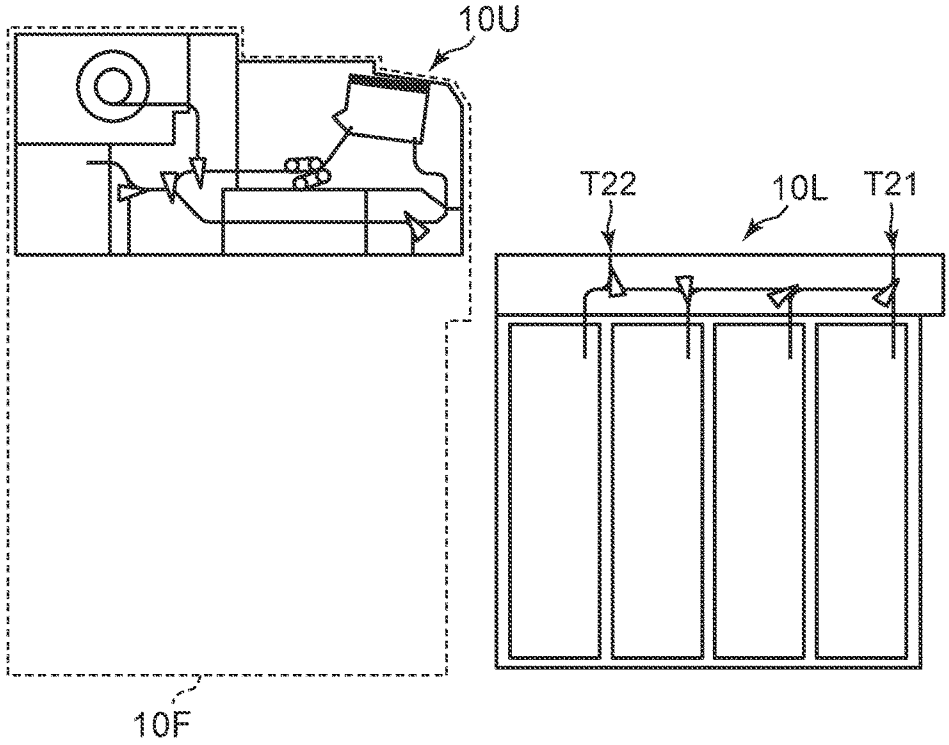
FIG. 3B is a left side view illustrating a state of pulling out a lower unit in the banknote deposit/withdrawal device.

The banknote deposit/withdrawal device frame 10F is attached to inside the casing 2 (FIG. 1). The upper unit 10U and the lower unit 10L are attached to the banknote deposit/withdrawal device frame 10F through slide rails extending in a front-rear direction. As illustrated in FIG. 3A and FIG. 3B, in the banknote deposit/withdrawal device 10, the upper unit 10U and the lower unit 10L can be respectively pulled out forward from the banknote deposit/withdrawal device frame 10F in a state where the front door 2D of the casing 2 is opened. As illustrated in FIG. 2, in the banknote deposit/withdrawal device 10, the upper unit 10U and the lower unit 10L can be respectively stored in the banknote deposit/withdrawal device frame 10F by pushing the upper unit 10U and the lower unit 10L rearward.

1-3. Configuration of the Upper Unit

As described in FIG. 2, the upper unit 10U is provided with a banknote controller 11 that performs overall control of the banknote deposit/withdrawal device 10, a customer interface section 12, an upper front conveyance section 13, a classification section 14, an upper rear conveyance section 15, a temporary holding section 16, and a reject box 17.

The banknote controller 11 is made up of a Central Processing unit (CPU), similarly to the main controller 9, and reads and executes predetermined programs from Read Only Memory (ROM), flash memory, or the like, in order to perform various processes such as a process to determine the conveyance destination of banknotes or a process to control the operation of the each part. The banknote controller 11 includes a storage section made up of Random Access Memory (RAM), flash memory, or similar storage devices to store information in the storage section.

The customer interface section 12 gives banknotes to a user and receives banknotes from a user, thereby allowing the user to deposit banknotes or dispense banknote to the user. The customer interface section 12 includes a container that stores banknotes, a shutter that opens and closes an opening, a separating unit that separates banknotes stored in the container one by one and feeds out the separated banknotes to a conveyance path, and a discharging unit that discharges banknotes that have been conveyed, and the like. When banknotes are inserted into the container by a user, the customer interface section 12 closes the shutter and separates banknotes stored in the container one by one by the separating unit, thereby sequentially handing off to the upper front conveyance section 13 located on the lower side of the container. When banknotes are conveyed from the upper rear conveyance section 15, the customer interface section 12 allows the user to receive banknotes by opening the shutter after the banknotes are sequentially discharged and stacked into the container by the discharging unit.

The upper front conveyance section 13 includes three conveyance paths respectively connected to the customer interface section 12 located in the upper side, the classification section 14 located in the rear side and a lower conveyance section 21 located in the lower side. A switching unit is provided in a connecting portion of the three conveyance paths. The upper front conveyance unit 13 can switch to a conveyance route connecting the customer interface section 12 and the classification section 14, or a conveyance route connecting the classification section 14 and the lower conveyance section 21, based on the control of the banknote controller 11.

The classification section 14 is located at the lower side of the customer interface section 12 and the rear side of the upper front conveyance section 13. A conveyance path extending in a front-rear direction is formed inside the classification section 14, and various sensors such as a magnetic sensor, an image sensor, a thickness sensor, and so on are disposed along the conveyance path. The classification section 14 sends out various detection results obtained by the various sensors as classification results from the banknote conveyed along the conveyance path to the banknote controller 11. In response to this, the banknote controller 11 identifies the denomination, the authenticity, and the physical condition (the presence or absence of damage) of banknote and recognizes the conveyance state based on the classification results. Hereby, the banknote controller 11 determines a conveyance route of a banknote and a conveyance destination of a banknote based on the obtained results.

The upper rear conveyance section 15 is located at the rear side of the customer interface section 12 and the classification section 14. The upper rear conveyance section 15 is formed with a plurality of conveyance paths respectively connected to the customer interface section 12, the classification section 14, the temporary holding section 16, the reject box 17, and the lower conveyance section 21, and a connection point of each of conveyance paths is provided with a switching unit.

The upper rear conveyance section 15 can switch to, based on the control of the banknote controller 11, a conveyance route connecting the classification section 14 and the customer interface section 12, a conveyance route connecting the classification section 14 and the temporary holding section 16, or a conveyance route connecting the classification section 14 and the lower conveyance section 21. In addition to this, the upper rear conveyance section 15 can switch to a conveyance route connecting the temporary holding section 16 and the customer interface section 12, or a conveyance route connecting the lower conveyance section 21 and the reject box 17.

The temporary holding section 16 employs what is referred to as tape escrow method, and includes a drum that is formed into a cylindrical shape and rotates, a tape having one end fixed to a circumferential side face of the drum, a reel that winds the tape from the other end side, a pulley that travels the tape along a predetermined travel path, and the like. The temporary holding section 16 causes the drum to rotate in a predetermined winding direction when receiving the banknotes from the upper conveyance section 15, and stores banknotes by wrapping the banknotes against the circumferential side face of the drum together with the tape. When rotating the drum in a rewinding direction opposite to the winding direction, the temporary holding section 16 peels the banknotes together with the tape from the circumferential side face of the drum and sequentially hands off the banknotes to the upper rear conveyance section 15.

The reject box 17 has a storage space for storing banknotes therein, and has a discharging mechanism for discharging banknotes into the storage space. When receiving banknotes determined to be heavily damaged and unsuitable for re-use (hereinafter, referred to as reject banknotes) from the upper rear conveyance section 15, the reject box 17 discharges the banknotes into the storage space by the discharging mechanism and stores the banknotes in a stacked state.

As illustrated in FIG. 3A, a lower end in the vicinity of the front end of the upper unit 10U is formed with an upper unit front hand-off port T11 to hand off banknotes to and from a lower unit front hand-off port T21 of the lower unit 10L (FIG. 3B). The lower end in the vicinity of a rear end of the upper unit 10U is formed with an upper unit rear hand-off port T12 to hand off banknotes to and from a lower unit rear hand-off port T22 of the lower unit 10L (FIG. 3B).

1-4. Configuration of the Lower Unit

As illustrated in FIG. 2, the lower unit 10L is provided with the lower conveyance section 21 and four banknote storage boxes 22 (22A, 22B, 22C and 22D).

The lower conveyance section 21 is located at the lower side of the upper front conveyance section 13, the classification section 14, the upper rear conveyance section 15 and the reject box 17, and is formed with a plurality of conveyance paths respectively connected to the upper front conveyance section 13, the upper rear conveyance section 15, and the four banknote storage boxes 22. Hereby, a connection point of each of conveyance paths is provided with a switching unit. The plurality of conveyance paths are configured by a roller, a belt, motor that drives the roller and the belt, or the like. The lower conveyance section 21 can switch to, based on the control of the banknote controller 11, a conveyance route connecting the upper front conveyance section 13 and each of banknote storage boxes 22, or a conveyance route connecting the upper rear conveyance section 15 and each of banknote storage boxes 22.

The four banknote storage boxes 22 (22A, 22B, 22C and 22D) that store banknotes, which can be reused (recycled) are disposed in the front-rear direction. The four banknote storage boxes 22 (22A, 22B, 22C and 22D) are disposed in order from the front side to the rear side. Each of banknote storage boxes 22 is formed in a cuboidal shape that is longer in the up-down direction than in the front-rear direction, and is provided with a storage space for accumulating and storing banknotes, a separating and discharging unit disposed above the storage space for separating and discharging banknotes, and the like. Each of the banknote storage boxes 22 is designated to store banknotes of a predetermined denomination. When receiving banknotes from the lower conveyance section 21 in a case of performing a storage process to store banknotes, the banknote storage box 22 conveys banknotes to the separating and discharging unit by a storage box conveyance section and discharges banknotes into the storage space, thereby storing banknotes in the storage space in an accumulated state. One the other hand, in a case of performing a feeding process to feed out banknotes, the banknote storage box 22 separates banknotes accumulated into the storage space one by one by the separating and discharging unit, and thereby these banknotes are conveyed above by the storage box conveyance unit and are handed off to the lower conveyance section 21.

As illustrated in FIG. 3B, an upper end in the vicinity of a front end of the lower unit 10L is formed with the lower unit front hand-off port T21 to hand off banknotes to and from the upper unit front hand-off port T11 of the upper unit 10U (FIG. 3A). An area of the lower unit 10L in which the upper unit front hand-off port T11 is connected to the lower unit front hand-off port T21 is an example of a hand-off area. The upper end in the vicinity of a rear end of the lower unit 10L is formed with the lower unit rear hand-off port T22 to hand off banknotes to and from the upper unit rear hand-off port T12 of the upper unit 10U (FIG. 3A).

In the banknote deposit/withdrawal device 10, the upper unit 10U and the lower unit 10L are housed in the banknote deposit/withdrawal frame 10F (FIG. 2). As such, the upper unit front hand-off port T11 and the lower unit front hand-off port T21 (FIG. 3B) are connected in the vicinity of the front end of the upper unit 10U and the lower unit 10L. A front connecting port C1 (FIG. 2) for handing off banknotes between the upper unit front hand-off port T11 and the lower unit front hand-off port T21 is formed. Further, in the banknote deposit/withdrawal device 10, the upper unit rear hand-off port T12 and the lower unit rear hand-off port T22 (FIG. 3B) are connected in the vicinity of rear end in the upper unit 10U and the lower unit 10L. A rear connecting port C2 (FIG. 2) for handing off banknotes between the upper unit rear hand-off port T11 and the lower unit rear hand-off port T22 is formed.

1-5. Configuration of the Lower Conveyance Section

Figure 4A:
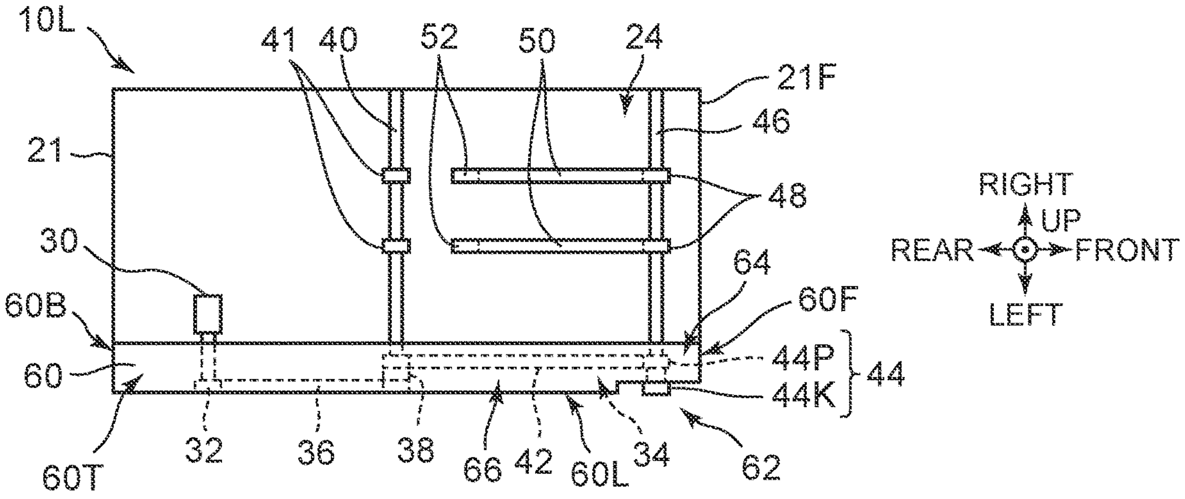
FIG. 4A is a plan view illustrating a configuration of the lower unit in a state where a cover is attached.
Figure 4B:
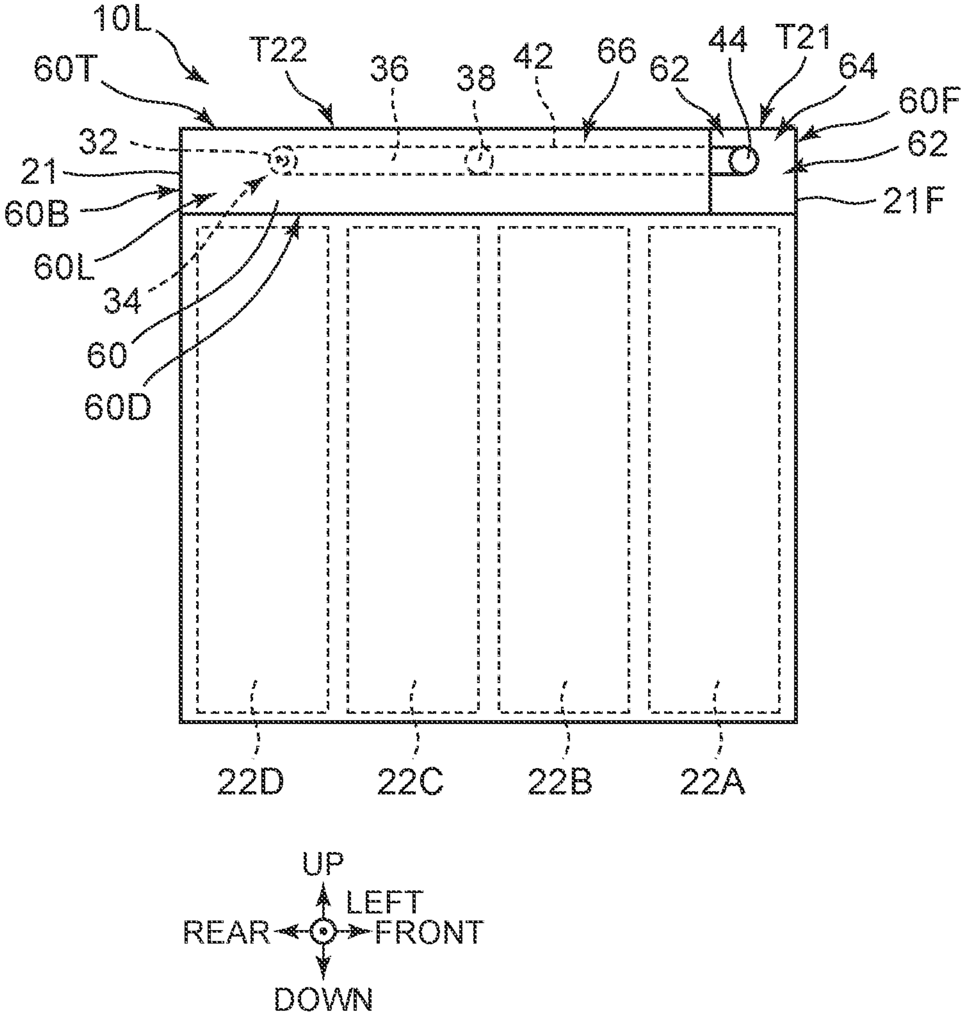
FIG. 4B is a left side view illustrating a configuration of the lower unit in a state where the cover is attached.
Figure 4C:
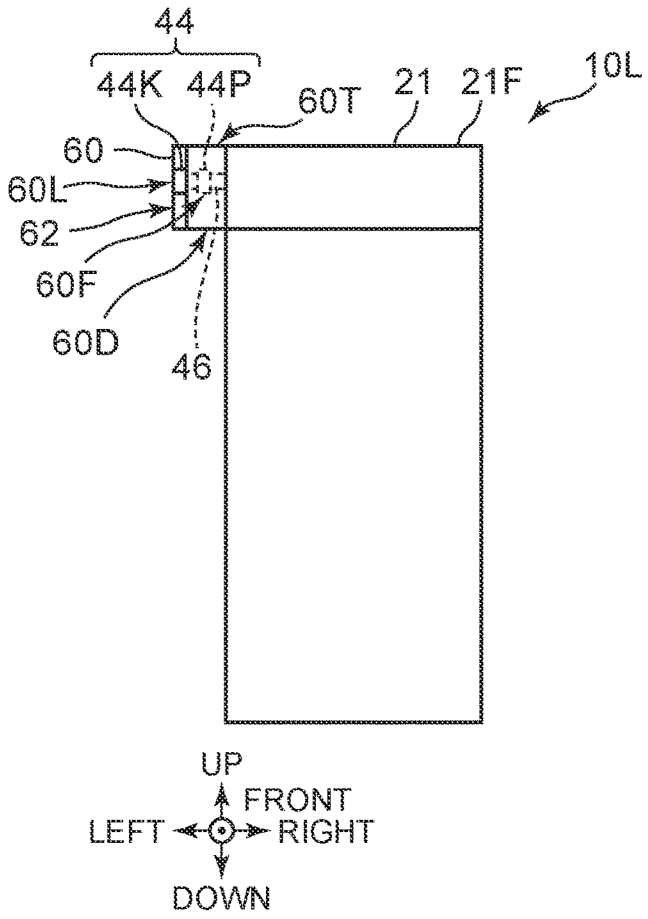
FIG. 4C is a front side view illustrating a configuration of the lower unit in a state where the cover is attached.
Figure 5A:
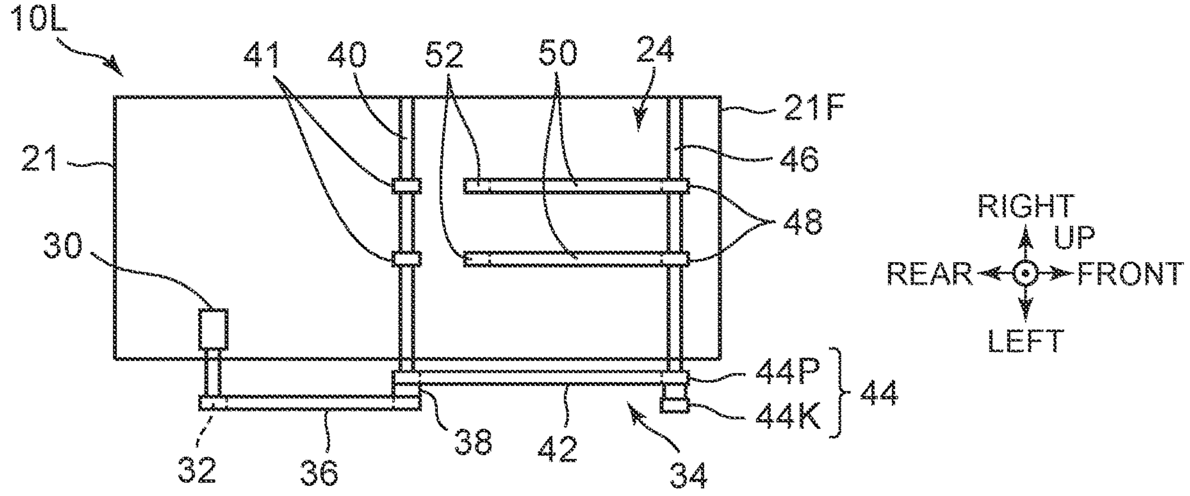
FIG. 5A is a plan view illustrating a configuration of the lower unit in a state where a cover is detached.
Figure 5B:
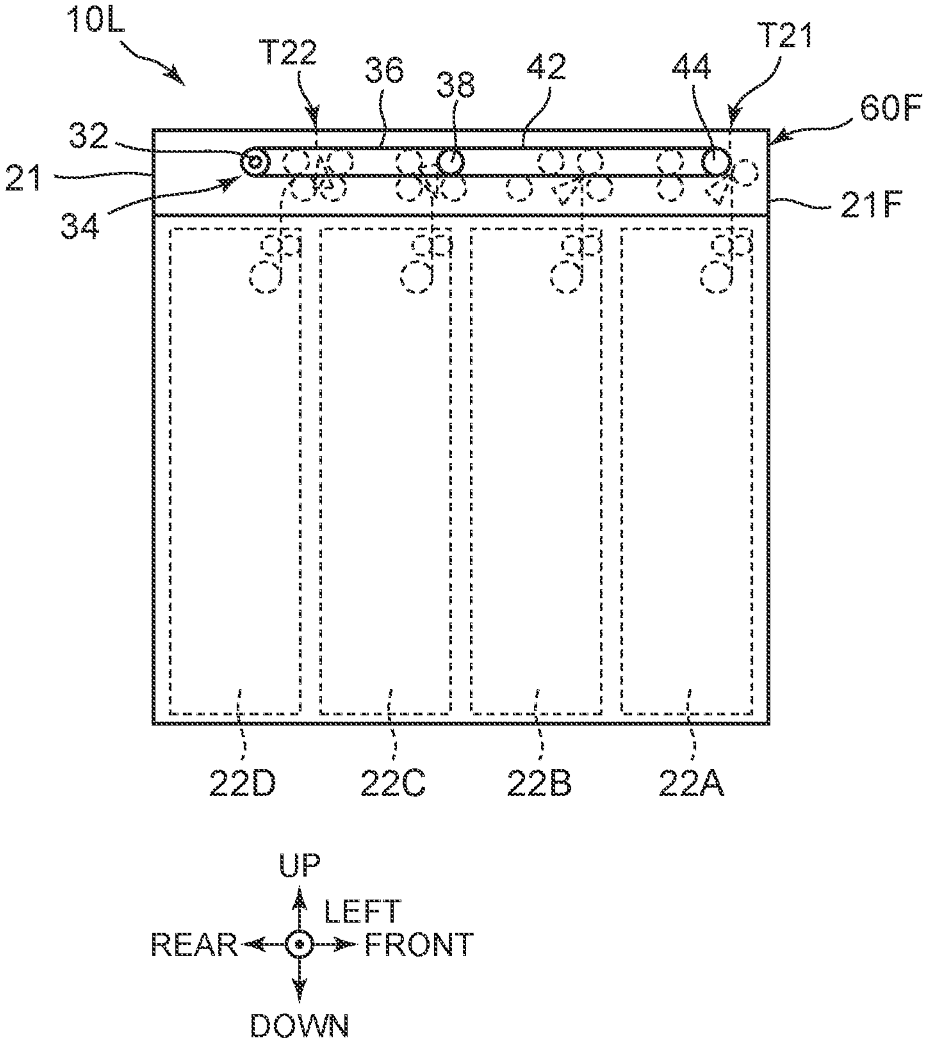
FIG. 5B is a left side view illustrating a configuration of the lower unit in a state where the cover is detached.
Figure 5C:
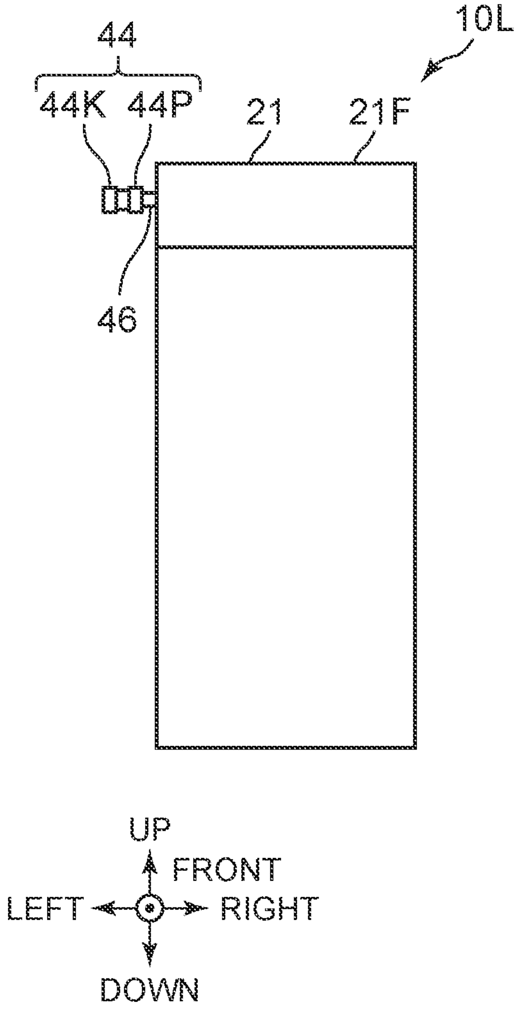
FIG. 5C is a front side view illustrating a configuration of the lower unit in a state where the cover is detached.

As illustrated in FIGS. 4A, 4B, 4C, 5A, 5B and 5C, the lower conveyance section 21 is attached to a lower conveyance section frame 21F, which is of a box-shape, and includes various parts. FIGS. 4A, 4B and 4C illustrate a state in which a cover 60 is attached to the lower conveyance section frame 21F. FIGS. 5A, 5B and 5C illustrate a state in which a cover 60 is detached from the lower conveyance section frame 21F.

A motor 30 is attached to the inside of the lower conveyance section frame 21F. An output shaft of the motor 30 penetrates a hole provided in a left side wall of the lower conveyance section frame 21F and projects to the left side of the lower conveyance section frame 21F. A conveyance mechanism 24 that conveys banknotes is provided in the lower conveyance section frame 21F. The conveyance mechanism 24 is mainly made up of a drive shaft 46, two drive rollers 48, two conveyance belts 50, two idle rollers 52, a rear drive shaft 40 and two drive rollers 41, and is formed with a conveyance path that conveys banknotes by those components. The conveyance mechanism conveys banknotes by appropriately rotating those components. In FIGS. 4A, 4B, 4C, 5A, 5B and 5C, a part of the components of the conveyance mechanism 24 is illustrated, and the other components are omitted.

A lower conveyance section driving transmission unit 34 that transmits driving force of the motor 30 to the conveyance mechanism 24 is provided in the left side and outside of the lower conveyance section frame 21 F. The lower conveyance section driving transmission unit 34 is made up of a motor pulley 32, a rear timing belt 36, a rear pulley 38, a front timing belt 42 and a pulley with knob 44.

The motor pulley 32 is of a gear shape, and is fixed to the output shaft of the motor 30. A rear end of the rear timing belt 36 is bridged on an outer peripheral surface of the motor pulley 32. The rear timing belt 36 is an endless belt bridged around the motor pulley 32 disposed in the rear end thereof and the rear pulley 38 disposed in the front end thereof, and extends in the front-rear direction. The rear timing belt 36 rotates with the rotation of the motor pulley 32 and transmits rotation force to the rear pulley 38. The rear pulley 38 is of a gear shape, and is disposed in the substantially middle portion of the lower conveyance section frame 21F in the front-rear direction. A front end of the rear timing belt 36 is bridged on an outer peripheral surface the rear pulley 38. The rear pulley 38 is fixed to the rear drive shaft 40, and is rotatably provided around the rear drive shaft 40. Further, the rear pulley 38 bridges a rear end of the front timing belt 42 provided in the right side of the rear timing belt 36. The rear drive shaft 40 is of a cylindrical shape, and extends in a left-right direction. The rear drive shaft 40 has left and right ends supported by the lower conveyance section frame 21F, and penetrates a hole provided in the left side wall of the lower conveyance section frame 21F, thereby extending to the left side of the lower conveyance section frame 21F. The two rear drive rollers 41 are provided the inside of the lower conveyance section frame 21F so as to be rotatable around the rear drive shaft 40, and are disposed side by side in the left-right direction at intervals shorter than the length of the banknote in the direction of the long side thereof. The rear drive rollers 41 mainly transmit the rotation force to rollers and conveyance belts disposed in the rear half of the lower conveyance section 21, thereby conveying banknotes conveyed in the vicinity of the lower unit rear hand-off port T22 (FIG. 3B).

The front timing belt 42 is an endless belt bridged around the rear pulley 38 disposed in the rear end thereof and a pulley portion 44P of the pulley with knob 44 disposed in the front end thereof, and extends in the front-rear direction. The front timing belt 42 rotates with the rotation of the rear pulley 38 and transmits rotation force to the pulley with knob 44.

The pulley with knob 44 is disposed in the vicinity of the front end of the lower conveyance section frame 21F (that is, in the vicinity of an end of the lower conveyance section frame 21F in a side of the casing opening 2A). A front end of the front timing belt 42 is bridged on an outer peripheral surface of the pulley with knob 44. The pulley with knob 44 is fixed to the drive shaft 46, and is rotatably provided around the drive shaft 46. The drive shaft 46 is of a cylindrical shape, and extends in the left-right direction. The drive shaft 46 has left and right ends supported by the lower conveyance section frame 21F, and penetrates a hole provided in the left side wall of the lower conveyance section frame 21F, thereby extending to the left side of the lower conveyance section frame 21F. The drive shaft 46 is disposed in the forefront (that is, in the frontmost side of the casing opening 2A) among a plurality of drive shafts providing in the lower conveyance section 21. Two drive rollers 48 are provided the inside of the lower conveyance section frame 21F so as to be rotatable around the drive shaft 46, and are disposed side by side in the left-right direction at intervals shorter than the length of the banknote in a long side direction. The front end of each of conveyance belts 50 is bridged on the outer peripheral surface of each of the drive roller 48. The drive rollers 48 mainly transmit the rotation force to conveyance belts 50 and idle rollers 52 disposed in the front half of the lower conveyance section 21, thereby conveying banknotes conveyed in the vicinity of the lower unit front hand-off port T21 (FIG. 3B). As described above, the pulley with knob 44 is interlocked with the drive shaft 46, and transmits the force to the conveyance belts 50 via the drive shaft 46, when manually rotated by an operator during maintenance work, thereby conveying banknotes by rotating the conveyance belts 50.

The conveyance belts 50 are endless belts bridged around the idle rollers 52 disposed in the rear end thereof and the drive roller 48 disposed in the front end thereof, and extends in the front-rear direction. Each of the conveyance belts 50 rotates to travel in the front-rear direction by rotating each of the drive rollers 48.

The idle rollers 52 rotate with the conveyance belts 50 around an idle shaft extending in the left-right direction. The rear end of each conveyance belts 50 is bridged on an outer peripheral surface of each of the idle rollers 52. The inside of the lower conveyance section frame 21F is provided with a plurality of idle rollers to face the rear drive rollers 41, the drive rollers 48 and the conveyance belts 50. Each of the idle rollers is attached to the lower conveyance section frame 21F so as to be rotatable around an idle shaft extending the left-right direction, and to be movable in a direction of contacting and separating with respect to the rear drive rollers 41, the drive rollers 48, and the conveyance belts 50, which are opposed. Each of the idle rollers rotates together with the rear drive rollers 41, the drive rollers 48, and the conveyance belts 50 which are opposed. Each of the idle rollers is biased to the rear drive roller 41, the drive roller 48 and the conveyance belt 50 which are opposed by a biasing member which is a compression spring.

In such a configuration of the lower conveyance section 21, when rotating the motor 30, the rotation force is transmitted to the rear drive rollers 41 via the rear timing belt 36, the rear pulley 38 and the rear drive shaft 40, thereby conveying banknotes located in the rear side of the lower conveyance section 21. In addition, the rotation force is transmitted to the drive roller 48 via the motor pulley 32, the rear timing belt 36, the rear pulley 38, the front timing belt 42, the pulley with knob 44 and the drive shaft 46, thereby conveying banknotes located in the front side of the lower conveyance section 21.

1-6. Configuration of the Pulley with Knob

The pulley with knob 44 is formed in a substantially cylindrical shape as a whole, and is integrally made up of the pulley portion 44P and a knob portion 44K. The pulley with knob 44 is directly attached to a portion of the drive shaft 46 that protrudes to the left side of the lower conveyance section frame 21F so as to be coaxial with the drive shaft 46. The pulley portion 44P is of a gear shape, and is a portion formed in the right end in the pulley with knob 44. The front end of the front timing belt 42 is bridged on an outer peripheral surface of the pulley portion 44P. The knob portion 44K serving as an operation knob is of a disk shape having a diameter and thickness substantially similar to the pulley portion 44P, and has a groove formed over the entire circumference of its outer peripheral surface in order to prevent slipping when an operator touches the knob portion 44K with fingertips.

When the operator touches the knob portion 44K from the side of the casing opening 2A and rotates the pulley with knob 44 in a first rotation direction, the drive rollers 48 located near the lower unit front hand-off port T21 rotate in the first rotation direction in conjunction with the pulley with knob 44. Therefore, the conveyance belts 50 and the idle rollers 52 rotate in the first rotation direction to move banknotes in a first direction in association with a rotation of the drive rollers 48 in the first rotation direction.

On the other hand, when the operator touches the knob portion 44K from the side of the casing opening 2A and rotates the pulley with knob 44 in a second rotation direction, the drive roller 48 located near the lower unit front hand-off port T21 rotates in the second rotation direction in conjunction with the pulley with knob 44. Thereby, the conveyance belts 50 and the idle rollers 52 rotate in the second rotation direction to move banknotes in a second direction in association with a rotation of the drive roller 48 in the second rotation direction.

In the banknote deposit/withdrawal device 10, the operator rotates the pulley with knob 44 in the first rotation direction or the second rotation direction, and therefore the drive rollers 48, the conveyance belts 50, and the like located near the lower unit front hand-off port T21 in the conveyance mechanism 24 can manually be driven. As a result, in the banknote deposit/withdrawal device 10, when an error occurs in which the banknotes are jammed in the vicinity of the lower unit front hand-off port T21 in the conveyance path of the lower conveyance section 21, the banknote jammed on the conveyance path and other banknotes retained together with the jam banknote can be conveyed in the same direction by rotating the pulley with knob 44 in the first rotation direction or the second rotation direction by the operator.

1-7. Configuration of the Cover

The cover 60 that is formed in a plate shape and covers the lower conveyance driving transmission unit 34 is attached to a left side face of the lower conveyance section frame 21F. The cover 60 is formed in a substantially box shape, and the right side of the cover that is in contact with the left side of the lower conveyance section frame 21F is open. The cover 60 has a top plate 60T on the upper side, a bottom plate 60D on the lower side, a rear plate 60B on the rear side, a side plate 60L on the left side, and a front plate 60F on the front side, and is formed with a covered space surrounded by the top plate 60T, the bottom plate 60D, the rear plate 60B, the side plate 60L and the front plate 60F. The covered space is formed in such a size that completely covers the upper side, the lower side, the rear side, the left side and the front side of the lower conveyance section driving transmission unit 34 except for the knob portion 44*k* of the pulley with knob 44. Thereby, the cover 60 covers the lower conveyance section driving transmission unit 34 so as not to be exposed to the outside, and protects the hand of the operator so that the lower conveyance section driving transmission unit 34 cannot be touched by the hand of the operator.

The cover 60 has a cover opening 62 formed in the left side of the front end thereof. The cover opening 62 has a shape in which the left side of the cover 60 is cut out from the upper end to the lower end of the cover 60 and in the front-rear direction from the front end of the cover 60 to the rear side of the pulley portion 44P. Thereby, the cover 60 has a rear cover portion 66 located on the rear side of the cover opening 62 and a front cover portion 64 located on the right side of the cover opening 62.

The front cover portion 64 covers from the left end face of the lower conveyance section frame 21F to a position where it covers the right side end portion of the knob portion 44K of the pulley with knob 44 by the top plate 60T, bottom plate 60D and the front plate 60F. The cover 60 is not provided in the upper side, the lower side, the left side and front side of the knob portion 44K. The rear cover portion 66 covers from the left end face of the lower conveyance section frame 21F to the left end of the rear timing belt 36 by the top plate 60T, the bottom plate 60D, the side plate 60L and the rear plate 60B.

The cover opening 62 exposes a front side of the knob portion 44K to the outside, and therefore the operator can operate the knob portion 44K from the side of the casing opening 2A (front side) in a state where the lower unit 10L is housed in the casing 2 (FIG. 2), that is, in a state where the lower unit 10L is not pulled out from the casing 2. Further, the cover opening 62 exposes a side of a maintenance face (a left side) of the knob portion 44K to the outside, and therefore the operator can operate the knob portion 44K from the side of the maintenance face in a state where the lower unit 10L is pulled out from the casing 2.

The cover 60 exposes not only the side of the maintenance face (left side) of the knob portion 44K but also the front side of the knob portion 44K, and therefore the operator can rotate the knob portion 44K not only from the side of the maintenance face (left side) but also from the front side. Further, the cover 60 covers the lower conveyance section driving transmission unit 34 so that the operator cannot operate it.

1-8. Removal of the Jammed Banknote

In the above-described configuration, when the jammed banknote BL is jammed at the front connecting port C1 as illustrated in FIG. 2, the operator can open the front door 2D of the ATM 1 and can operate the knob portion 44K of the pulley with knob 44 from the side of the casing opening 2A. Then, in the ATM 1, the operator rotates the knob portion 44K of the pulley with knob 44 from the side of the casing opening 2A, thereby rotating the drive rollers 48 and moving the jammed banknote to, for example, the lower unit 10L. At this time, an upper end of the jammed banknote BL is located below the upper unit front hand-off port T11 of the upper unit 10U (FIG. 3A). As a result, the ATM 1 eliminates a state in which the jammed banknote BL straddles between the upper unit 10U and the lower unit 10L, and brings the upper unit 10U and the lower unit 10L into a state in which they can be pulled out from the casing 2. Subsequently, in the ATM 1, the lower unit 10L is pulled out by the operator, and therefore the jammed banknote BL is removed from the inside of the lower unit 10L, that is, from the lower unit front hand-off port T21 exposed to the outside (FIG. 3B).

1-9. Effects

In the ATM 1 configured as described above, the pulley with knob 44 for rotating the drive shaft 46 is provided coaxially with the drive shaft 46 disposed in the vicinity of the end of the lower unit 10L in the side of the casing opening 2A. Thereby, in the ATM 1, the operator does not pull out the lower unit 10L from the casing 2, and can operate the knob portion 44K of the pulley with knob 44 from the side of the casing opening 2A with the lower unit 10L stored in the casing 2. Thereby, when the banknote remains so as to straddle both the upper unit 10U and the lower unit 10L, the ATM 1 can move the banknote so that the entire banknote are located in either the upper unit 10U or the lower unit 10L, and therefore, even if the operator does not pull out the lower unit 10L from the casing 2, the operator can eliminate a state where the banknote remains so as to straddle both the upper unit 10U and the lower unit 10L.

Hence, the ATM 1 can prevent the upper unit 10U or the lower unit 10L from being forcibly pulled out from the casing 2 in a state where the banknote remains to straddle the upper unit 10U and the lower unit 10L, and can prevent the banknote from being broken. Further, the ATM 1 can eliminate a state in which the banknote remains to straddle the upper unit 10U and the lower unit 10L, and can thus allow the operator to pull out the lower unit 10L from the casing 2 in order to remove the jammed banknote.

The ATM 1 is configured such that the knob portion 44K is formed integrally with the pulley portion 44P, which is a part of the lower conveyance section driving transmission unit 34. For this reason, the ATM 1 only needs to add the knob portion 44K to an existing pulley having the same shape as the pulley portion 44P (that is, the pulley with knob 44 only needs to be provided). Therefore, ATM 1 can be configured so that the configuration does not have to be unnecessarily complicated.

In the ATM 1, the pulley with knob 44 having the knob portion 44K is provided coaxially with the drive shaft 46, and is directly connected to the drive shaft 46. For this reason, in comparison with a case where the knob portion is separately formed with a different shaft that is different from the shaft of the pulley portion and an idle gear is provided between the knob portion and the drive shaft 46 to transmit the rotation force of the knob portion to the drive shaft 46 via the idle gear, the ATM 1 does not require the idle gear and a sheet metal, a roller, a spring, or the like, which are a disconnecting member for preventing the rotation force from being transmitted from the knob portion to the drive shaft 46. Therefore, the ATM 1 can be configured so that the configuration does not have to be unnecessarily complicated.

Herein, in the ATM 1, the banknotes frequently pass through the front connecting port C1 in deposit transactions, withdrawal transactions, and the like. Then, the banknotes pass through the rear connecting port C2, for example, in a case of a banknote moving process for moving banknotes from the banknote storage box 22A to the banknote storage box 22D. Therefore, in the ATM 1, more banknotes often pass the front connecting port C1 rather than the rear connecting port C2. The ATM 1 receives banknotes that are damaged or deformed from the outside in deposit transactions. For this reason, the ATM 1 has a high possibility that the banknotes will be jammed in the front connecting port C1 rather than the rear connecting port C2.

The ATM 1 is provided with the pulley with knob 44 that rotates the drive roller 48 that comes into contact with the banknotes conveyed through the front connecting port C1. On the other hand, the ATM 1 is unlikely to cause a large problem in actual operation without providing the pulley with knob to remove the jammed banknote in the vicinity of the rear connecting port C2.

In a conventional ATM, although the operator can visually recognize the banknote jammed in the vicinity of the front connecting port C1 from the outside when the operator opens the front door 2D, the operator cannot remove the jammed banknote by pulling out the upper unit 10U or the lower unit 10L from the casing 2, and therefore the operator was stressed.

In contract, the ATM 1 is provided with the pulley with knob 44 that rotates the drive roller 48 that comes into contact with the banknotes conveyed through the front connecting port C1. The ATM 1 can allow the operator to move the banknote that can be seen from the outside by rotating the knob portion 44K of the pulley with knob 44 without pulling out the upper unit 10U or the lower unit 10L from the casing 2, and thereby the ATM can prevent the operator from being stressed that the operator cannot remove the jammed banknote despite the fact that the operator can see the jammed banknote.

The ATM 1 of the present disclosure includes the interface section 3 that receives a transaction relating to the banknote as the sheet-shaped medium, a casing 2 that has the casing opening 2A as an opening formed in the front side as the side of the opening where an internal space and an outside are in communication with each other, and is formed with the front door 2D as a door that can open and close the casing opening 2A, the upper unit 10U and the lower unit 10L that are formed so as to be pulled out from and stored into the casing 2, a conveyance mechanism 24 that is provided in at least one of the upper unit 10U and the lower unit 10L, and that conveys the banknote by rotating a drive roller 48 as a roller, and a pulley with knob 44 that is provided in the vicinity of an end of at least one of the upper unit 10U and the lower unit 10L in the side of the opening, and that rotates the drive roller 48.

Hereby, the ATM 1 allows the operator to easily operate the knob portion 44K of the pulley with knob 44 from the side of the opening and then allows to move the jammed banknote in the conveyance mechanism 24 by rotating the drive shaft 46 and the drive roller 48 of the conveyance mechanism 24 so that the jammed banknote is not straddled between the upper unit 10U and the lower unit 10L, and therefore the ATM 1 can allow the operator to remove the jammed banknote by pulling out a unit on a side where the jammed banknote remains from the casing 2.

2. Other Exemplary Embodiments

In the above-described exemplary embodiment, a case has been described in which the pulley with knob 44 is provided in the lower unit 10L. However, the present disclosure is not limited to this. For example, the pulley with knob 44 may be provided coaxially with a drive shaft in the upper unit 10U, and the pulley with knob may be provided in the upper unit 10U in addition to the pulley with knob 44 in the lower unit 10L.

In the above-described exemplary embodiment, a case has been described in which the pulley with knob 44 is integrally made up of a pulley portion 44P and a knob portion 44K. However, the present disclosure is not limited to this. For example, the knob portion 44K and the pulley portion 44P may not be integrated. Specifically, the present disclosure may be configured such that the rotation force may be transmitted to the pulley portion 44P by various mechanisms when the knob portion 44K is rotated.

In the above-described exemplary embodiment, a case has been described in which the knob portion 44K of the pulley with knob 44 is directly attached on the same axis of the drive shaft 46. However, the present disclosure is not limited to this. For example, the knob portion 44K may separately be configured from the pulley portion 44P, and a predetermined number of idle gears may be provided between the knob portion 44K and the drive shaft 46, and therefore the rotation force rotated the knob portion 44K may be transferred to the drive shaft 46 via the idle gears. In this case, the drive shaft to which the rotation of the knob portion 44K is transmitted may not be disposed, for example, in the vicinity of the end portion of the banknote deposit/withdrawal device 10 in the side of the casing opening 2A. Specifically, the knob portion 44K may be disposed in the vicinity of the end portion of the banknote deposit/withdrawal device 10 in the side of the casing opening 2A so that the operator can easily operate it manually.

In the above-described exemplary embodiment, a case has been described in which the drive roller 48 for conveying banknotes in the vicinity of the front connecting port C1 located in the vicinity of the front end of the banknote deposit/withdrawal device 10 is driven by the pulley with knob 44. However, the present disclosure is not limited to this. For example, the rear drive roller 41 for conveying banknotes in the vicinity of the rear connecting port C2 located in the vicinity of the rear end of the banknote deposit/withdrawal device 10 may be driven by the pulley with knob 44.

In the above-described exemplary embodiment, a case has been described in which the pulley with knob 44 is made up of the knob portion 44K and the pulley portion 44P. However, the present disclosure is not limited to this. For example, the pulley with knob 44 may omit the knob portion 44K, and may be provided with only the pulley portion 44P. Thereby, the front side of the outer peripheral surface of the front timing belt 42 that is bridged on the pulley portion 44P may be operated from the side of the opening by the operator. Specifically, a roller manual drive section that can manually rotate the drive shaft 46 may be provided in a state where the lower unit 10L is not pulled out from the casing 2.

In the above-described exemplary embodiment, a case has been described in which the pulley with knob 44 is provided only in the left side of the lower conveyance section frame 21F. However, the present disclosure is not limited to this. For example, a pulley with knob may separately be provided in the right side face of the lower conveyance section frame 21F in the side of the casing opening 2A, in addition to the pulley with knob 44, and therefore the drive roller for conveying banknotes in the vicinity of the rear connecting port C2 may be driven by the pulley with knob.

In the above-described exemplary embodiment, a case has been described in which the cover opening 62 of the cover 60 exposes the front side and the left side of the knob portion 44K of the pulley with knob 44 to the outside. However, the present disclosure is not limited to this. For example, the cover opening 62 of the cover 60 may expose at least the front side of the knob portion 44K of the pulley with knob 44 to the outside. Further, the cover opening 62 of the cover 60 may expose the front side of the pulley portion 44P in addition to the knob portion 44K of the pulley with knob 44, and therefore the operator may rotate the drive shaft 46 by rotating the outer peripheral surface of the front timing belt 42 that is bridged on the pulley portion 44P.

In the above-described exemplary embodiment, a case has been described in which the cover 60 is provided. However, the present disclosure is not limited to this. For example, the cover 60 may not be provided and may be omitted.

In the above-described exemplary embodiment, a case has been described in which the upper unit 10U and the lower unit 10L are disposed in the up-down direction. However, the present disclosure is not limited to this. For example, these units may be disposed in the left-right direction as a right side unit and a left side unit, and the conveyance belt and the like may be disposed in the left-right direction or the front-rear direction. Further, three or more units may be disposed in the left-right direction, and may be disposed in the left-right direction and the up-down direction.

In the above-described exemplary embodiment, a case has been described in which the present disclosure is applied to the banknote deposit/withdrawal device 10 having the two units of the upper unit 10U and the lower unit 10L. However, this present disclosure is not limited to this. For example, the present disclosure may be applied to the banknote deposit/withdrawal device 10 having an arbitrary number of units of three or more.

In the above-described exemplary embodiment, a case has been described in which the front door 2D is provided only in the front face side of the casing 2. However, the present disclosure is not limited to this. For example, a door may be provided in the rear side in addition to the front side of the casing 2, and a pulley with knob may be provided in the vicinity of an end of the banknote deposit/withdrawal device 10 in the rear side.

In the above-described exemplary embodiment, a case has been described in which the present disclosure is applied to the banknote deposit/withdrawal device 10 of the ATM 1 that performs the transaction process relating to the banknote with customers. However, the present disclosure is not limited to this. For example, the present disclosure may be applied to various devices that handle various sheet-shape media such as cash vouchers, securities, entrance tickets, passenger tickets, or the like.

In the above-described exemplary embodiment, a case has been described in which the ATM 1 as a medium transaction device is configured by the interface section 3 as a user interface section, the casing 2 as a casing, the upper unit 10U and the lower unit 10L as a plurality of units, the conveyance mechanism 24 as a conveyance section, and the pulley with knob 44 as a roller manual drive section. However, the present disclosure is not limited to this. For example, the medium transaction device may be configured by a user interface section, a casing, a plurality of units, a conveyance section, and a roller manual drive section of various other configurations.

As described above, exemplary embodiments and other exemplary embodiments have been described. However, the present disclosure may be combined the configurations of one or more the above-described exemplary embodiments and other exemplary embodiments.

INDUSTRIAL APPLICABILITY

The present disclosure may be employed in, for example, a banknote deposit/withdrawal device incorporated in an automatic teller machine that performs a deposit transaction or a withdrawal transaction regarding banknotes with a user.

The application claims priority from Japanese Patent Application No. 2018-098005, filed on May 22, 2018, the disclosure of which is incorporated in its entirety by reference herein.

The invention claimed is:

1. A medium processing device, comprising:
   - a casing that has an opening through which an interior of the casing communicates with an exterior thereof, and a door that opens and closes the opening;
   - a first unit that is storable in the casing, with a first end thereof at a side of the opening, the first unit being configured to be pullable out from the casing;
   - a second unit that is storable in the casing, with a second end thereof at the side of the opening, the second unit being configured to be pullable out from the casing;
   - a conveyance section, including a roller, provided in the first unit, the conveyance section conveying a medium by rotating the roller;
   - a roller manual drive section that is provided in the first unit, and that is configured to allow the roller to be manually rotated;
   - a motor;
   - a belt that transmits a driving force from the motor; and
   - a cover that covers the belt, and that has a cover opening that exposes the operation knob, wherein
   - the medium is handed off at a hand-off area of the first unit to which the second unit is connected,
   - the roller manual drive section is provided in a vicinity of the first end of the first unit when the first unit is stored in the casing, and
   - the roller is provided in a vicinity of the hand-off area, and rotates when the medium is handed off between the first unit and the second unit,
   - the roller is a drive roller that rotates around a drive shaft, and
   - the roller manual drive section is an operation knob provided coaxially with the drive shaft.

2. The medium processing device of claim 1, wherein the hand-off area is provided in the vicinity of the first end of the first unit, and of the second end of the second unit, when the first and second units are stored in the casing.

3. The medium processing device of claim 1, wherein the operation knob is formed integrally with a pulley that rotates the drive shaft.

4. The medium processing device of claim 1, wherein the roller manual drive section is directly and manually operable from outside by an operator when the first unit and the second unit are stored in the casing.

5. The medium processing device of claim 1, wherein
   - the medium processing device has a maintenance face and a non-maintenance face, the maintenance face being a side of the medium processing device at which an operator performs maintenance work, and the roller manual drive section is provided at the maintenance face.

6. The medium processing device of claim 1, further comprising a cover that covers the roller manual drive section, a first side of which faces the opening when the first and second units are stored in the casing, wherein the cover has a cover opening that exposes at least a part of the roller manual drive section at the first side thereof.

7. The medium processing device of claim 6, wherein the cover has a side at which an operator performs maintenance work, and the cover exposes a part of the roller manual drive section at said side.

8. A medium transaction device, comprising:

a user interface that receives an input for a transaction instruction relating to a sheet-shaped medium;

a casing that has an opening through which an interior of the casing communicates with an exterior thereof, and a door that opens and closes the opening;

a first unit that is storable in the casing, with a first end thereof at a side of the opening, the first unit being configured to be pullable out from the casing;

a second unit that is storable in the casing, with a second end thereof at the side of the opening, the second unit being configured to be pullable out from the casing;

a conveyance section, including a roller, provided in the first unit, the conveyance section conveying a medium by rotating the roller;

a roller manual drive section that is provided in the first unit, and that is configured to allow the roller to be manually rotated;

a motor;

a belt that transmits a driving force from the motor; and a cover that covers the belt, and that has a cover opening that exposes the operation knob, wherein the medium is handed off at a hand-off area of the first unit to which the second unit is connected, the roller manual drive section is provided in a vicinity of the first end of the first unit when the first unit is stored in the casing, and the roller is provided in a vicinity of the hand-off area, and rotates when the medium is handed off between the first unit and the second unit, the roller is a drive roller that rotates around a drive shaft, and the roller manual drive section is an operation knob provided coaxially with the drive shaft.

* * * * *